United States Patent
Fugiel et al.

(10) Patent No.: US 7,261,943 B2
(45) Date of Patent: Aug. 28, 2007

(54) INTERLAYER COMPOSITE STRUCTURE FOR LAMINATING GLASS WITH CONTROLLED DIFFUSING PROPERTIES AT HIGH TRANSMISSION AND A PROCESS FOR MAKING SAME

(75) Inventors: Richard A. Fugiel, Washington, WV (US); Thomas R. Phillips, Vienna, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/508,742

(22) PCT Filed: May 2, 2003

(86) PCT No.: PCT/US03/13800

§ 371 (c)(1),
(2), (4) Date: Sep. 21, 2004

(87) PCT Pub. No.: WO03/093000

PCT Pub. Date: Nov. 13, 2003

(65) Prior Publication Data

US 2005/0142366 A1    Jun. 30, 2005

Related U.S. Application Data

(60) Provisional application No. 60/380,070, filed on May 3, 2002.

(51) Int. Cl.
B32B 17/10    (2006.01)

(52) U.S. Cl. ............... 428/437; 428/323; 428/426; 428/332; 428/213; 428/215; 428/220; 428/328; 428/436; 524/425; 524/435; 524/437; 524/493; 524/556

(58) Field of Classification Search ........... 428/437, 428/323, 426, 332, 213, 215, 220, 328, 436; 524/425, 435, 437, 493, 556
See application file for complete search history.

(56) References Cited

U.S. PATENT DOCUMENTS 6,737,159 B2 *    5/2004    Garrett et al. .............. 428/332

* cited by examiner

*Primary Examiner*—Robert D. Harlan
(74) *Attorney, Agent, or Firm*—Kevin S. Dobson

(57) ABSTRACT

The present invention is a translucent interlayer, or a laminate obtained therefrom, that has low clarity, high haze, and light transmission of at least 60 percent wherein the aesthetic qualities of etched or sandblasted glass are substantially recreated. In addition, a laminate of the present invention provides the safety characteristics of laminated safety glass. In addition, the process for making the translucent laminates of the present invention can eliminate the safety and environmental concerns related to sandblasting or etching processes.

26 Claims, 3 Drawing Sheets

INTERLAYER COMPOSITE STRUCTURE FOR LAMINATING GLASS WITH CONTROLLED DIFFUSING PROPERTIES AT HIGH TRANSMISSION AND A PROCESS FOR MAKING SAME

This application claims the benefit of U.S. Provisional Application No. 60/380,070, filed May 3, 2002.

FIELD OF THE INVENTION

The present invention relates to laminated safety glass. More specifically, the present invention relates to translucent laminated safety glass.

BACKGROUND OF THE INVENTION

Plasticized polyvinyl butyral sheet (PVB) is used in the manufacture of laminate structures such as, for example: windshields for vehicles including automobiles, motorcycles, boats and airplanes; homes and buildings; shelving in cabinets and display cases; and other articles where structural strength is desirable in a glass sheet. In many applications, it is desirable that the laminate be transparent and colorless. In other applications it can be desirable for the laminate to be translucent. Translucent laminates have been known in the art of laminated safety glass for many years.

Typically, translucent laminates have light transmission levels of 70 percent or less. However, translucent or semi-transparent laminates having higher light transmission levels, for example from 80 to 90 percent transmission—and also with high light diffusion properties—are typically prepared using sandblasted or etched glasses.

Sandblasting is a process that can be used for making glass less transparent by bombarding the surface of the glass with high-velocity sand particles, glass beads or similar aggregate, propelled under pressure from a sandblasting apparatus. Etching is a process by which the surface is chemically etched by application of a chemical, such as an acid which reacts on the surface of the glass to reduce the transparency in the areas where the chemical contacts the glass surface. Either of these processes can create a roughened surface on the glass, thereby causing a scattering, or diffusion, of incident light at the surface of the glass.

While the processes of sandblasting and etching can create glass with from low to high opacity, and with light diffusion and light transmission properties offering aesthetic appeal in architectural applications, the processes themselves can be dangerous because of the handling of the etching acids and/or silicosis from the glass dust created. Further, any operation that creates imperfections in the glass surface creates stresses that can lead to failures of the glass when handled or impacted, thereby reducing its safety properties. An additional problem encountered with glass having a roughened surface is that the surface can be difficult to clean where dirt becomes trapped in creases on the glass.

Typically, commercially available white interlayers have a very low level of light transmission. In fact, white interlayer products that are commercially available allow light to pass through but do not allow a person to recognize or discern the shape of an object through the interlayer, or through any laminate prepared therefrom.

It would be desirable to have a translucent, or semi-transparent, glass laminate that affords some measure of object recognition through the laminate, wherein the laminate has the aesthetic characteristics of sandblasted or etched glass, and at the same time has the strength of a standard transparent safety glass laminate.

It would also be desirable to obtain such an aesthetically pleasing laminate by a process that reduces or eliminates the safety risks associated with manufacturing sandblasted or etched glass.

SUMMARY OF THE INVENTION

In one aspect, the present invention is an interlayer composition comprising particles of colorant having a particle size of less than about 10 microns, wherein the interlayer: (1) has a haze of from about 25 percent to about 90 percent, (2) allows at least about 60 percent of incident light to be transmitted through the interlayer, and (3) has clarity of at least 20%.

In another aspect, the present invention is a glass laminate comprising at least two pieces of glass and an interlayer positioned therebetween, wherein the interlayer: (1) comprises particles of colorant having a particle size of less than about 10 microns, wherein the interlayer: (1) has a haze of from about 25 percent to about 90 percent, (2) allows at least about 60 percent of incident light to be transmitted through the interlayer, and (3) has clarity of at least 20%.

In another aspect, the present invention is a process for producing an PVB sheet suitable for laminated glass applications, the process comprising the steps of (a) feeding colorant into an extruder at a controlled rate; (b) co-extruding polyvinyl butyral resin, colorant, plasticizer, and other optional additives; (c) quenching the molten sheet composition to obtain a PVB sheet having dimensional stability suitable for laminated glass applications, wherein the interlayer: (1) has a haze of from about 25 percent to about 90 percent, (2) transmits at least about 70 percent of incident light through the interlayer, and (3) has clarity of at least 20%.

DETAILED DESCRIPTION

Figure 1:
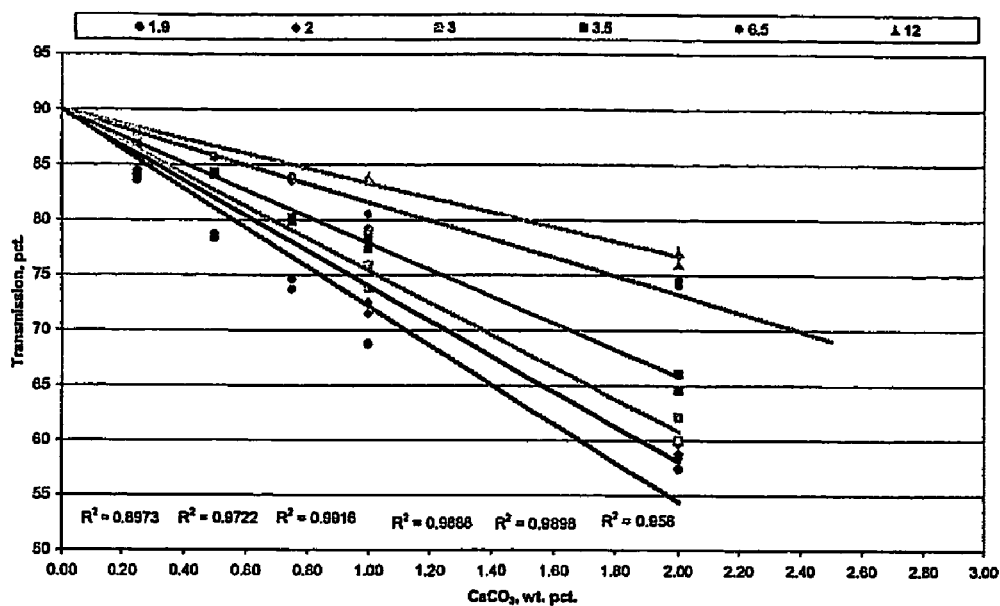
FIG. 1 is a plot of Transmission vs concentration of ground calcium carbonate ($CaCO_3$) as a function of particle size.

In one embodiment, the present invention is an interlayer composition comprising colorant particles. An interlayer of the present invention can be made from any material that is suitable for use as interlayer material in glass laminate articles. For example, the interlayer material can be an acid copolymer or a salt thereof, such as for example, an ethylene/methacrylic acid copolymer or a neutralized version thereof. The interlayer material can be a polyurethane polymer, a polyester polymer, or a polyvinyl butyral (PVB) polymer. Preferably the interlayer material comprises a plasticized PVB polymer.

Polyvinyl butyral suitable for use in the practice of the present invention can be prepared according to any method known or conventionally practiced in the manufacture of PVB sheet. For example, U.S. Pat. No. 3,153,009 describes a process for commercial manufacture of PVB that is suitable for use in the practice of the present invention. PVB resins used in the practice of the present invention can be prepared by mixing PVA with butyraldehyde in an aqueous medium in the presence of an acid or mixture of acids, at a temperature of from 5° C. to 100° C.

Typically, the ratio of PVA to butyraldehyde is chosen such that the PVB has residual hydroxyl functionality, conventionally reported as weight percent polyvinyl alcohol. Residual hydroxyl functionality can vary according to what properties are desirable in the PVB. The relative amounts of butyraldehyde and PVA required to obtain the desired residual weight percent polyvinyl alcohol in the PVB resin will be readily apparent to those skilled in the art of PVB manufacture. In the practice of the present invention residual hydroxyl can be in the range of from about 14 to about 30 weight percent. Preferably, the residual weight percent polyvinyl alcohol is from about 15 to about 25. More preferably, the residual weight percent polyvinyl alcohol is from about 15 to about 20, and most preferred in the practice of the present invention is PVB resin having a residual weight percent polyvinyl alcohol in the range of from about 17 to about 19. The residual weight percent polyvinyl alcohol can be determined according to standard methods such as ASTM D1396-92.

A PVB composition of the present invention includes colorant. A colorant of the present invention can be any material that is mixed with the PVB composition and that imparts color to a PVB sheet. For the purposes of the present invention the term "colorant", in either the singular or plural form, not only refers to black, green, red, blue, and yellow colorants, or to various combinations thereof, but also to white colorants and combinations of white colorants with other colorants. The term "colorant" can also refer to a "mixture of colorants". The reader should be able to discern the proper meaning of the term from the context in which it is used. The color imparted to a PVB sheet by a colorant suitable for use herein can be any color produced in the visible light spectrum, provided that color can be reproduced in a PVB sheet of the present invention. Colorants useful in the practice of the present invention can be added either in solid form, as a solution, or as a solid/liquid dispersion to the PVB composition. For example, dyes or pigments can be added in liquefied form to the PVB for ease of processing. It should be noted, however, that dyes are generally soluble in the resin matrix and will add color but not contribute to haze in the interlayer. In the practice of the present invention it is required that at least one colorant be a solid particle dispersed in the interlayer composition.

In a particularly preferred embodiment of the present invention, the PVB composition comprises a colorant that consists essentially of at least one white colorant. As the exception noted hereinabove, the white colorant is preferably added as a particulate material. However, the colorant can be added as a concentrate or as a component in recycled sheet material by techniques well known in the art Any white colorant known or used conventionally as such can be suitable for use in the present invention. Preferably the white colorant is selected from the group consisting of barium sulfate ($BaSO_4$), magnesium sulfate ($MgSO_4$), magnesium oxide (MgO), magnesium silicate ($MgSiO_3$), titanium dioxide ($TiO_2$), zinc oxide (ZnO), zinc sulfate ($ZnSO_4$), antimony oxide ($Sb_xO_y$) wherein x is either 2 or 4 and y is from 3 to 6, calcium phosphate ($Ca_3(PO_4)_2$), calcium sulfate ($CaSO_4$), or calcium carbonate ($CaCO_3$), or mixtures thereof.

Figure 3:
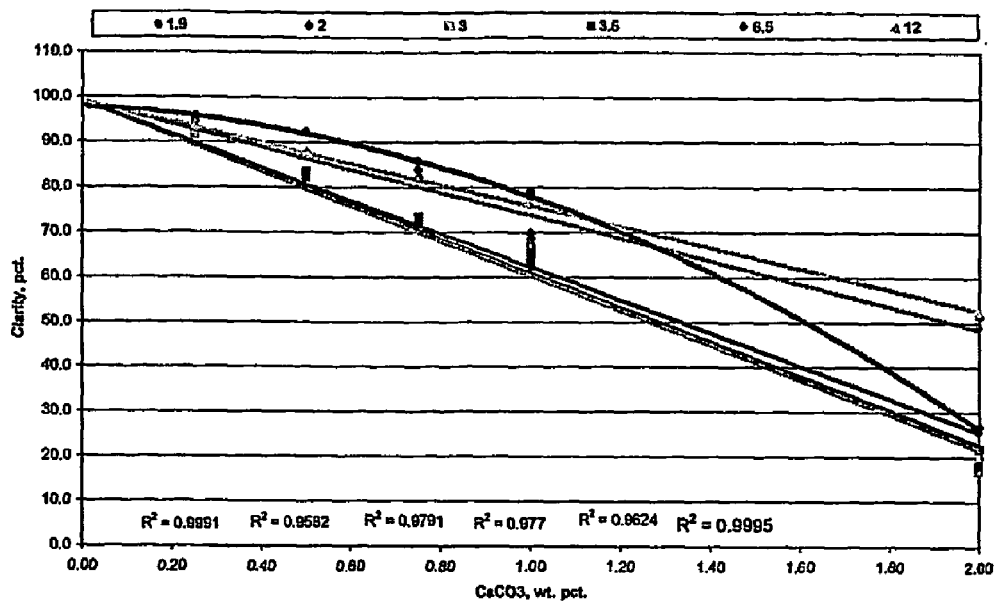
FIG. 3 is a plot of Clarity vs concentration of ground $CaCO_3$ as a function of particle size.
Figure 5:
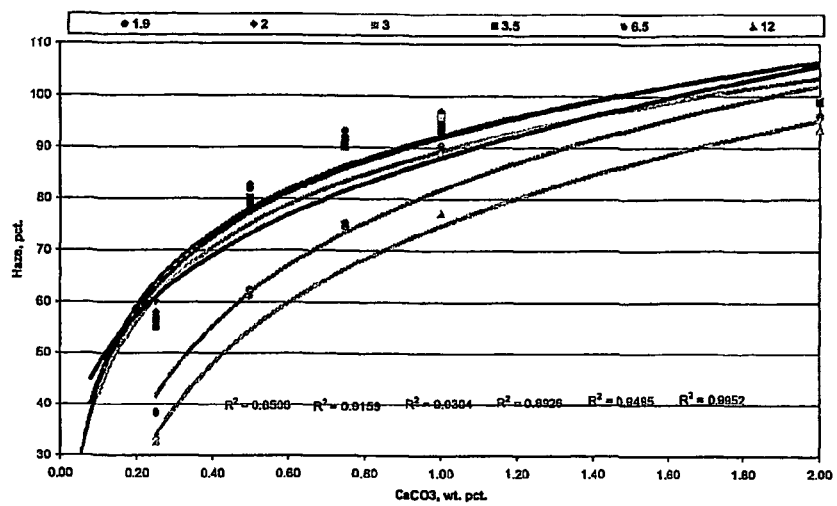
FIG. 5 is a plot of Haze vs concentration of ground $CaCO_3$ as a function of particle size.

While not absolutely critical to the practice of the present invention, the concentration of colorant can be a factor in the appearance of a PVB sheet of the present invention, or laminates obtained therefrom. FIGS. 1, 3, and 5 show the relationships of concentration to transmission of light, clarity, and haze. The concentration of colorant in an interlayer of the present invention can be controlled by conventional processes for controlling the concentration of an additive. For example, the concentration of a colorant that is co-extruded with the PVB resin can be controlled by controlling the rate at which the colorant is metered into the extruder.

The concentration of the colorant should be chosen such that the interlayer or laminate has a light transmission of at least 60% of the incident light. Incident light, for the purposes of the present invention, is light that reaches the surface of the interlayer or laminate article of the present invention. Preferably light transmission is at least about 75%, more preferably at least about 80%, and most preferably at least about 85%. Light transmission can be determined by any conventional method used for such a determination. For example, a conventional spectrophotometer can be used to determine the percent light transmitted by an interlayer of the present invention.

A colorant can be added to a PVB composition of the present invention at a concentration of less than about 2.0 wt %. Preferably, the colorant is added at a concentration of from about 0.9 wt % to about 1.8 wt %. More preferably the concentration of the colorant is from about 0.6 wt % to about 1.5 wt %, and most preferably from about 0.3 wt % to about 0.75 wt %. Below about 0.10 wt % the clarity may be too high and the haze too low. Above 2.0 wt % haze may be too high and clarity may be too low.

However, depending on other factors, such as particle size for example, the concentration of colorant added in the practice of the present invention can exceed the range disclosed herein and not be outside of the scope of the invention contemplated herein. The critical factor is that the PVB sheet in a laminate of the present invention has high light transmission, with clarity that gives a laminate of the present invention substantially the same or similar appearance as a sheet of etched or sandblasted glass.

Figure 2:
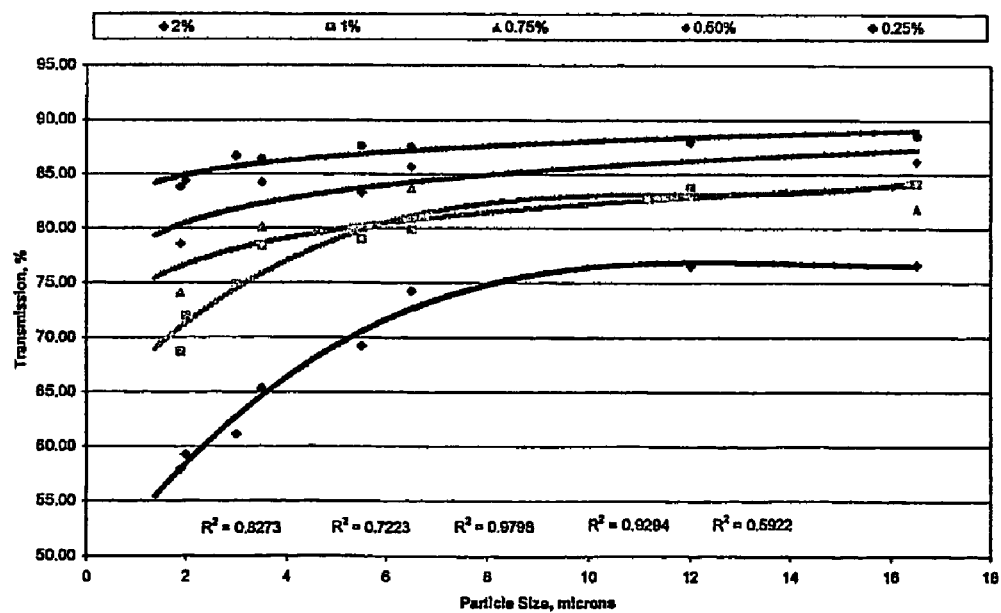
FIG. 2 is a plot of Transmission vs Particle Size as a function of concentration of ground $CaCO_3$.
Figure 4:
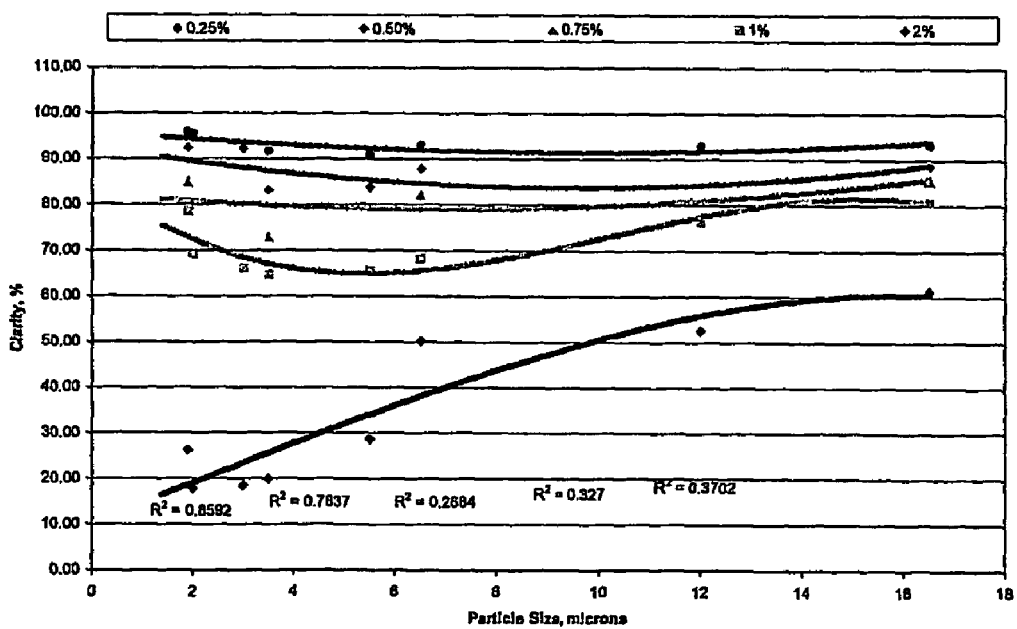
FIG. 4 is a plot of Clarity vs Particle Size as a function of concentration of ground $CaCO_3$.
Figure 6:
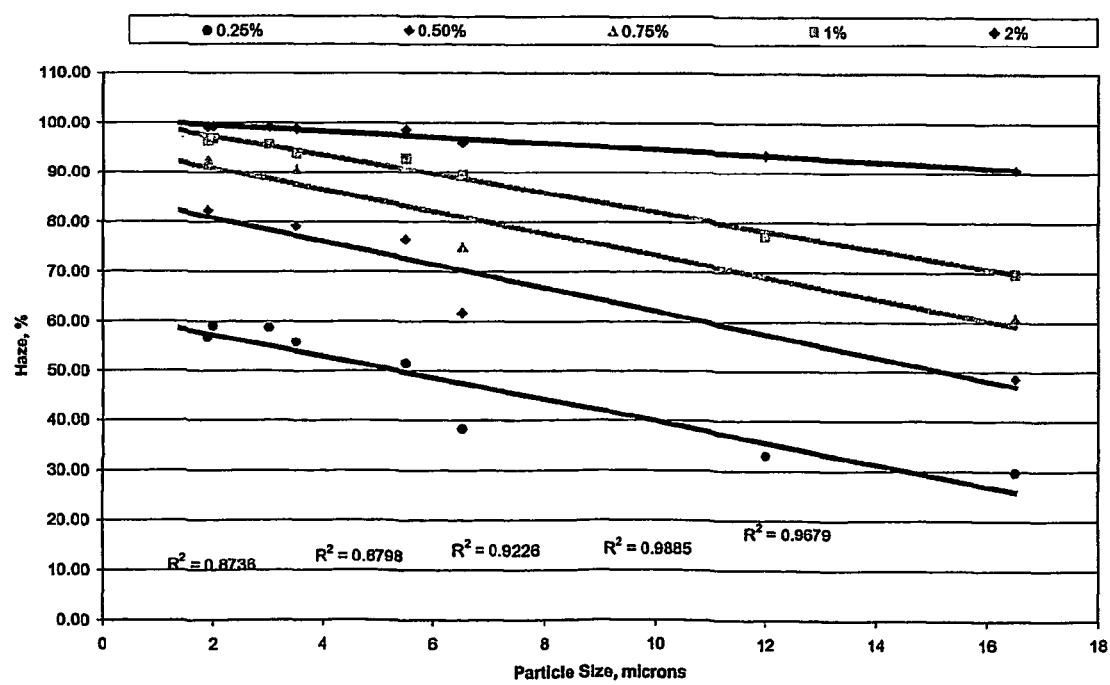
FIG. 6 is a plot of Haze vs Particle Size as a function of concentration of ground $CaCO_3$.

Careful selection and/or manipulation of the particle size of the colorants can control the clarity and diffusive power of the sheet and the resulting laminates. The particle size of the colorant can be controlled by conventional methods such as use of an appropriately sized sieve. Alternatively, the desired size of particle can be obtained from commercial manufacturers of the colorant. FIGS. 2, 4 and 6 show the relationships of the particle size to the properties of transmission of light, haze and clarity.

A particulate colorant has a median particle size (particle size) of less than about 10 microns. Preferably, the particle size of the colorant is from about 2 microns to about 10 microns, more preferably from about 2.5 microns to about 8 microns, and most preferably from about 3 microns to about 6 microns. Without being held to theory, there apparently is a direct relationship between particle size and clarity and an inverse relationship between particle size and haze. For any given weight percent, the larger the colorant particles, the greater clarity and the lower the haze in the PVB sheet and the resulting laminates. The smaller the particles, the less clarity, the greater haze, and the more diffusive power exhibited by the sheet and the resulting laminates.

Clarity of interlayers of the present invention should be at least 20%. Preferably the clarity of an interlayer of the present invention is from about 35% to about 100%, more preferably from about 45% to about 95%, even more preferably from about 50% to about 90%, and most preferably from about 60% to about 85%.

The haze of an interlayer sheet of the present invention is related to the diffusive power. In an interlayer composition of the present invention, the diffusive power, as measured by percent haze on an instrument such as, for example, a hazemeter, is preferably in the range of from about 25 percent to about 90 percent. More preferably, the percent haze is in the range of from about 40 percent to about 85 percent, even more preferably from about 50 percent to about 80 percent, and most preferably in the range of from about 55 percent to about 75 percent.

A PVB composition of the present invention includes a plasticizer. Plasticizers of the present invention can be chosen from any that are known or used conventionally in the manufacture of plasticized PVB sheeting compositions. A plasticizer suitable for use herein can be a plasticizer or a mixture of-plasticizers selected from the group consisting of: di-esters obtained from the chemical reaction of aliphatic diols with carboxylic acids, including di-esters of polyether diols or polyether polyols; and, esters obtained from poly-valent carboxylic acids and aliphatic alcohols. Preferred plasticizers for use herein are di-esters obtained by the reaction of triethylene glycol or tetraethylene glycol with aliphatic carboxylic acids having from 6 to 10 carbon atoms; and di-esters obtained from the reaction of sebacic acid with aliphatic alcohols having from 1 to 18 carbon atoms. More preferably the plasticizer is either triethylene glycol di-(2-ethylhexanoate) (3GO), tetraethylene glycol di-heptanoate (4G7), or di-butyl sebacate (DBS). Most preferably the plasticizer is 3GO.

Plasticizer can be added in any amount desirable to obtain a plasticized PVB sheet. Plasticizer can be added in an amount of from about 5 to about 50 parts per hundred (pph) resin, based upon the total dry weight of the resin. The "dry weight" as used herein refers to the weight of the dry resin, that is, after water has been removed from the resin. Preferably the plasticizer is present in an amount of from about 20 to about 45 pph, and most preferably in an amount of from about 32 to about 45 pph.

Plasticization can be carried out using either a "wet" process or a "dry" process. The wet process, as the term is used herein, is a process whereby the plasticizer is mixed with a PVB resin aqueous slurry, together with other additives, prior to, or as, the mixture is fed into an extruder. A residence time of from 2 to 24 hours for the plasticizer/PVB mixture can be preferred prior to sending the mixture to an extruder. A wet process suitable for use herein is described in U.S. Pat. No. 3,153,009, for example. A dry process, as the term is used herein, is a process whereby the plasticizer is mixed with the dry PVB resin flake prior to, or as, the mixture is fed into an extruder. A dry process suitable for use herein is described in U.S. Pat. No. 5,886,075, for example.

A surfactant is included in preparing a PVB composition of the present invention. A surfactant suitable for use herein can be any that is known to be useful in the art of polyvinyl butyral manufacture. For example, surfactants suitable for use herein include: sodium lauryl sulfate; ammonium lauryl sulfate; sodium dioctyl sulfosuccinate; ammonium perfluorocarboxylates having from 6 to 12 carbon atoms; sodium aryl sulfonates, adducts of chlorinated cyclopentadiene and maleic anhydride; partially neutralized polymethacrylic acid; alkylaryl sulfonates; sodium N-oleyl-N-methyl taurate; sodium alkylaryl polyether sulfonates; triethanolamine lauryl sulfate; diethyl dicyclohexyl ammonium lauryl sulfate; sodium secondary-alkyl sulfates; sulfated fatty acid esters; sulfated aryl alcohols; and the like. Preferable surfactants include sodium lauryl sulfate, sodium dioctyl sulfosuccinate, sodium cocomethyl tauride, and decyl(sulfophenoxy) benzenesulfonic acid disodium salt.

Optional additives can be included in a resin composition of the present invention without affect on the stereoisomerism of the PVB. Such additives include antioxidants, light stabilizers, adhesion control agents, and/or surface tension controlling agent, as well as other additives.

In another embodiment, the present invention is a laminate comprising the interlayer sheet of the present invention. The laminate can be obtained from any combination of interlayer with glass or plastic materials. For example, a laminate of the present invention can be comprised of glass and the interlayer of the present invention, or the laminate can be comprised of a polymeric material and the interlayer of the present invention, or the laminate can be comprised of a combination of glass and a polymeric material with the interlayer of the present invention. A polymeric material suitable for use with the interlayer of the present invention can be any polymeric material known to be suitable for use in applications such as windows or doors as a substitute for glass or glass laminates. Suitable polymers are, for example: polycarbonates; acrylic acid and/or acrylic ester polymers and copolymers methacrylic acid and/or methacrylic ester polymers and copolymers; or polyesters can be suitable thermoplastic materials for use herein. Preferably, the laminate is a glass laminate, comprising at least two pieces of glass with the interlayer of the present invention disposed therebetween. A laminate of the present invention can be assembled according to known and conventional practices. For example, a laminate of the present invention can be assembled by a process comprising the steps: layering a glass sheet, an interlayer of the present invention, and another glass sheet together under heat and pressure to form the laminate. Various techniques for improving the quality of the laminate are known and conventional, such as roughening the surface of the interlayer prior to lamination in order to provide channels to allow air to escape from the laminate during the lamination process.

In another embodiment, the present invention is a process for preparing a translucent PVB sheet. A translucent PVB sheet of the present invention can be obtained by co-extruding PVB with a white colorant and a plasticizer. The extrusion can be carried out at a temperature in the range of from about 175° C. to about 245° C. depending, at least in part, on how much plasticizer is included. The extruded translucent sheet can be quenched, or cooled, to a temperature at or below about 40° C. but above a temperature of about 10° C. Preferably the sheet is cooled to a temperature below about 25° C., more preferably the sheet is cooled to a temperature below about 20°, and most preferably the sheet is cooled to a temperature below about 15° C. The extruded sheet can be rolled and stacked for storage. In any event, a sheet of the present invention can be used to make a laminate as described hereinabove.

EXAMPLES

The following Examples and comparative examples are presented to further illustrate the present invention. The Examples are not intended to limit the scope of the invention in any manner, nor should they be used to define the claims or specification in any manner that is inconsistent with the invention as claimed and/or as described herein.

Test Methods

Haze is determined according to ASTM D1003, and is defined as the percentage of transmitted light that deviates from the incident by more than 2.5 degrees. Clarity is defined as the percentage of transmitted light that deviates from the incident light by less than 0.1 degrees. Haze/Clarity measurements were obtained using either a Byk-Gardner Hazegard® Plus (HG Plus) or a Hunter Lab Ultrascan® Sphere Spectrophotometer (Ultrascan).

Comparative Example C1

Translucent white PVB sheeting was prepared using $CaCO_3$ having a median particle size of 3.5 microns. The PVB dried resin, tetraethyleneglycol di-heptanoate (4G7) and calcium carbonate were fed in a controlled manner to a twin-screw extruder at nominally 210° C. The resulting 30-mil thick sheeting was quenched on a chill roll. The final composition contained nominally 70.3 wt. % of PVB, 27.8 wt. % of 4G7 and 1.9 wt. % of calcium carbonate. Laminates were prepared by placing the sheeting between two pieces of clear glass, de-airing by passing through a set of nip rolls and then autoclaving in an air autoclave with a hold cycle of 135° C. and 200 psi for 20 minutes. The clarity, haze and the % transmission of light were measured on a HG Plus. The results are given in Table 1.

Examples 1-33

Dry PVB resin, 4G7 plasticizer and calcium carbonate were "dry" blended together on a tumbler for 4 hours and then fed into a single screw extruder at a temperature of nominally 210° C. and extruded. The resulting melt was pressed into 30-mil thick sheet. Laminates were prepared as in C1. The clarity, haze and the % transmission of light were measured on a HG Plus. The results are given in Table 1.

TABLE 1

| Example | Colorant | Particle Size (microns) | Wt. % Colorant | Haze (%) | Clarity (%) | Transmission (%) |
|---|---|---|---|---|---|---|
| C1 | $CaCO_3$ | 3.50 | 1.9 | 98.7 | 23.6 | 62.1 |
| 1 | $CaCO_3$ | 1.9 | 0.25 | 56.7 | 95.8 | 83.8 |
| 2 | $CaCO_3$ | 1.9 | 0.50 | 82.3 | 92.3 | 78.6 |
| 3 | $CaCO_3$ | 1.9 | 0.75 | 92.6 | 84.9 | 74.2 |
| 4 | $CaCO_3$ | 1.9 | 1.00 | 96.3 | 78.5 | 68.8 |
| 5 | $CaCO_3$ | 1.9 | 2.00 | 99.2 | 26.2 | 57.9 |
| 6 | $CaCO_3$ | 2.0 | 0.25 | 59.0 | 95.5 | 84.4 |
| 7 | $CaCO_3$ | 2.0 | 1.00 | 96.8 | 69.2 | 72.0 |
| 8 | $CaCO_3$ | 2.0 | 2.00 | 99.3 | 17.8 | 59.3 |
| 9 | $CaCO_3$ | 3.0 | 0.25 | 58.8 | 92.2 | 86.7 |
| 10 | $CaCO_3$ | 3.0 | 1.00 | 95.7 | 66.1 | 74.9 |
| 11 | $CaCO_3$ | 3.0 | 2.00 | 99.2 | 18.5 | 61.1 |
| 12 | $CaCO_3$ | 3.5 | 0.25 | 55.8 | 91.7 | 86.4 |
| 13 | $CaCO_3$ | 3.5 | 0.50 | 79.1 | 83.1 | 84.2 |
| 14 | $CaCO_3$ | 3.5 | 0.75 | 90.5 | 72.8 | 80.1 |
| 15 | $CaCO_3$ | 3.5 | 1.00 | 93.8 | 64.7 | 78.4 |
| 16 | $CaCO_3$ | 3.5 | 2.00 | 98.9 | 19.9 | 65.4 |
| 17 | $CaCO_3$ | 5.5 | 0.25 | 51.6 | 90.9 | 87.6 |
| 18 | $CaCO_3$ | 5.5 | 0.50 | 76.5 | 83.8 | 83.3 |
| 19 | $CaCO_3$ | 5.5 | 1.00 | 92.7 | 65.6 | 79.0 |
| 20 | $CaCO_3$ | 5.5 | 2.00 | 98.6 | 28.7 | 69.2 |
| 21 | $CaCO_3$ | 6.5 | 0.25 | 38.3 | 93.1 | 87.5 |
| 22 | $CaCO_3$ | 6.5 | 0.50 | 61.7 | 87.8 | 85.7 |
| 23 | $CaCO_3$ | 6.5 | 0.75 | 74.9 | 82.2 | 83.7 |
| 24 | $CaCO_3$ | 6.5 | 1.00 | 89.5 | 68.1 | 79.9 |
| 25 | $CaCO_3$ | 6.5 | 2.00 | 96.0 | 50.2 | 74.3 |
| 26 | $CaCO_3$ | 12.0 | 0.25 | 33.1 | 93.0 | 88.0 |

TABLE 1-continued

| Example | Colorant | Particle Size (microns) | Wt. % Colorant | Haze (%) | Clarity (%) | Transmission (%) |
|---|---|---|---|---|---|---|
| 27 | $CaCO_3$ | 12.0 | 1.00 | 77.2 | 76.4 | 83.8 |
| 28 | $CaCO_3$ | 12.0 | 2.00 | 93.6 | 52.5 | 76.6 |
| 29 | $CaCO_3$ | 16.5 | 0.25 | 29.8 | 93.2 | 88.6 |
| 30 | $CaCO_3$ | 16.5 | 0.50 | 48.6 | 88.6 | 86.2 |
| 31 | $CaCO_3$ | 16.5 | 0.75 | 60.9 | 85.5 | 81.9 |
| 32 | $CaCO_3$ | 16.5 | 1.00 | 69.7 | 80.7 | 84.2 |
| 33 | $CaCO_3$ | 16.5 | 2.00 | 90.6 | 61.3 | 76.7 |

What is claimed is:

1. An interlayer composition comprising particles of colorant having a particle size of less than about 10 microns, wherein an interlayer sheet formed from the interlayer composition: (1) has a haze of from about 25 percent to about 90 percent, (2) allows at least about 60 percent of incident light to be transmitted through the interlayer, and (3) has clarity of at least 20%.

2. The composition of claim 1 wherein the colorant has a particle size of from about 2 microns to about 10 microns.

3. The composition of claim 2 wherein the colorant has a particle size of from about 2.5 microns to about 8 microns.

4. The composition of claim 3 wherein the colorant has a particle size of from about 3 microns to about 6 microns.

5. The composition of claim 1 wherein the concentration of the colorant is less about 2.0 weight percent based on the total weight of the interlayer.

6. The composition of claim 5 wherein the concentration of colorant is from about 0.9 weight percent to about 1.8 weight percent.

7. The composition of claim 6 wherein the concentration of colorant is from about 0.6 weight percent to about 1.5 weight percent.

8. The composition of claim 7 wherein the concentration of colorant is from about 0.3 weight percent to about 0.75 weight percent.

9. The composition of claim 8 wherein the colorant is selected from the group consisting of: $BaSO_4$; $MgSiO_3$; $MgSO_4$; $MgO$; $ZnO$; $ZnSO_4$; $Sb_xO_y$ wherein x is either 2 or 4 and y is from 3 to 6; $TiO_2$; $Ca_3(PO_4)_2$; $CaSO_4$; $CaCO_3$, or any mixture thereof.

10. The composition of claim 9 wherein the colorant is selected from $TiO_2$, $CaCO_3$, or a mixture thereof.

11. The composition of claim 10 wherein the colorant is $CaCO_3$.

12. A glass laminate comprising at least two pieces of glass and an interlayer composition positioned therebetween to form an interlayer sheet, wherein the interlayer sheet: (1) comprises particles of colorant having a particle size of less than about 10 microns, (2) has a haze of from about 25 percent to about 90 percent, (3) allows at least about 60 percent of incident light to be transmitted through the interlayer, and (4) has clarity of at least 20%.

13. The glass laminate of claim 12 wherein the interlayer composition comprises a colorant having a particle size of from about 2 microns to about 10 microns.

14. The glass laminate of claim 13 wherein the interlayer composition includes a colorant having a particle size of from about 2.5 microns to about 8 microns.

15. The glass laminate of claim 14 wherein the interlayer composition includes a colorant having a particle size of from about 3 microns to about 6 microns.

16. The glass laminate of claim 12 wherein the percent haze is from about 40 percent to about 85 percent.

17. The glass laminate of claim 16 wherein the percent haze is from about 50 percent to about 80 percent.

18. The glass laminate of claim 17 wherein the percent haze is from about 55 percent to about 75 percent.

19. The glass laminate of claim 12 which transmits from at least about 75 percent of incident light.

20. The glass laminate of claim 19 which transmits at least about 80 percent of the incident light.

21. The glass laminate of claim 20 which transmits at least about 85 percent of the incident light.

22. The glass laminate of claim 12 wherein the clarity is from about 35% to about 100%.

23. The glass laminate of claim 22 wherein the clarity is from about 45% to about 95%.

24. The glass laminate of claim 23 wherein the clarity is from about 50% to about 90%.

25. The glass laminate of claim 24 wherein the clarity is from about 60% to about 85%.

26. A process for producing an PVB sheet suitable for laminated glass applications, the process comprising the steps of (a) feeding colorant into an extruder at a controlled rate; (b) co-extruding polyvinyl butyral resin, colorant, plasticizer, and other optional additives; (c) quenching the molten sheet composition to obtain a PVB sheet having dimensional stability suitable for laminated glass applications, wherein the PVB sheet: (1) has a haze of from about 25 percent to about 90 percent, (2) allows at least about 60 percent of incident light to be transmitted through the interlayer, and (3) has clarity of at least 20%.

* * * * *